United States Patent [19]

Park

[11] Patent Number: 5,459,531
[45] Date of Patent: Oct. 17, 1995

[54] GAMMA-COMPENSATING CIRCUIT USING THE AMPLIFICATION DEGREE OF A TRANSISTOR

[75] Inventor: Hae-Ryong Park, Seoul, Rep. of Korea

[73] Assignee: Daewoo Electronics Co., Ltd., Seoul, Rep. of Korea

[21] Appl. No.: 229,880

[22] Filed: Apr. 19, 1994

[30] Foreign Application Priority Data

Apr. 21, 1993 [KR] Rep. of Korea ............... 93-6715

[51] Int. Cl.⁶ .................................................. H04N 5/202
[52] U.S. Cl. ..................... 348/675; 348/707; 348/677
[58] Field of Search .................... 348/674, 675, 348/677, 691, 695, 707, 608; 330/149; H04N 5/18, 5/202

[56] References Cited

U.S. PATENT DOCUMENTS

| | | | |
|---|---|---|---|
| 4,152,665 | 5/1979 | Cunningham | 330/149 |
| 4,480,268 | 10/1984 | Osawa et al. | 358/164 |
| 4,589,021 | 5/1986 | Sato et al. | 358/164 |
| 5,083,198 | 1/1992 | Haferl et al. | 348/675 |
| 5,087,966 | 2/1992 | Harradine | 348/675 |
| 5,119,040 | 6/1992 | Long et al. | 330/149 |
| 5,119,392 | 6/1992 | Childs | 330/149 |

*Primary Examiner*—James J. Groody
*Assistant Examiner*—Jeffrey S. Murrell
*Attorney, Agent, or Firm*—Lowe, Price, LeBlanc & Becker

[57] ABSTRACT

A gamma-compensating circuit has a voltage amplifying unit for amplifying a gamma-compensated picture signal from a broadcasting station and a nonlinear-compensation unit for converting an output amplification degree of the voltage amplifying unit to linearize the amplified gamma-compensated picture signal in accordance with a voltage level of the gamma-compensated picture signal. A linearized amplified gamma-compensated picture signal is obtained from the gamma-compensated picture signal transmitted from a broadcasting station.

4 Claims, 2 Drawing Sheets

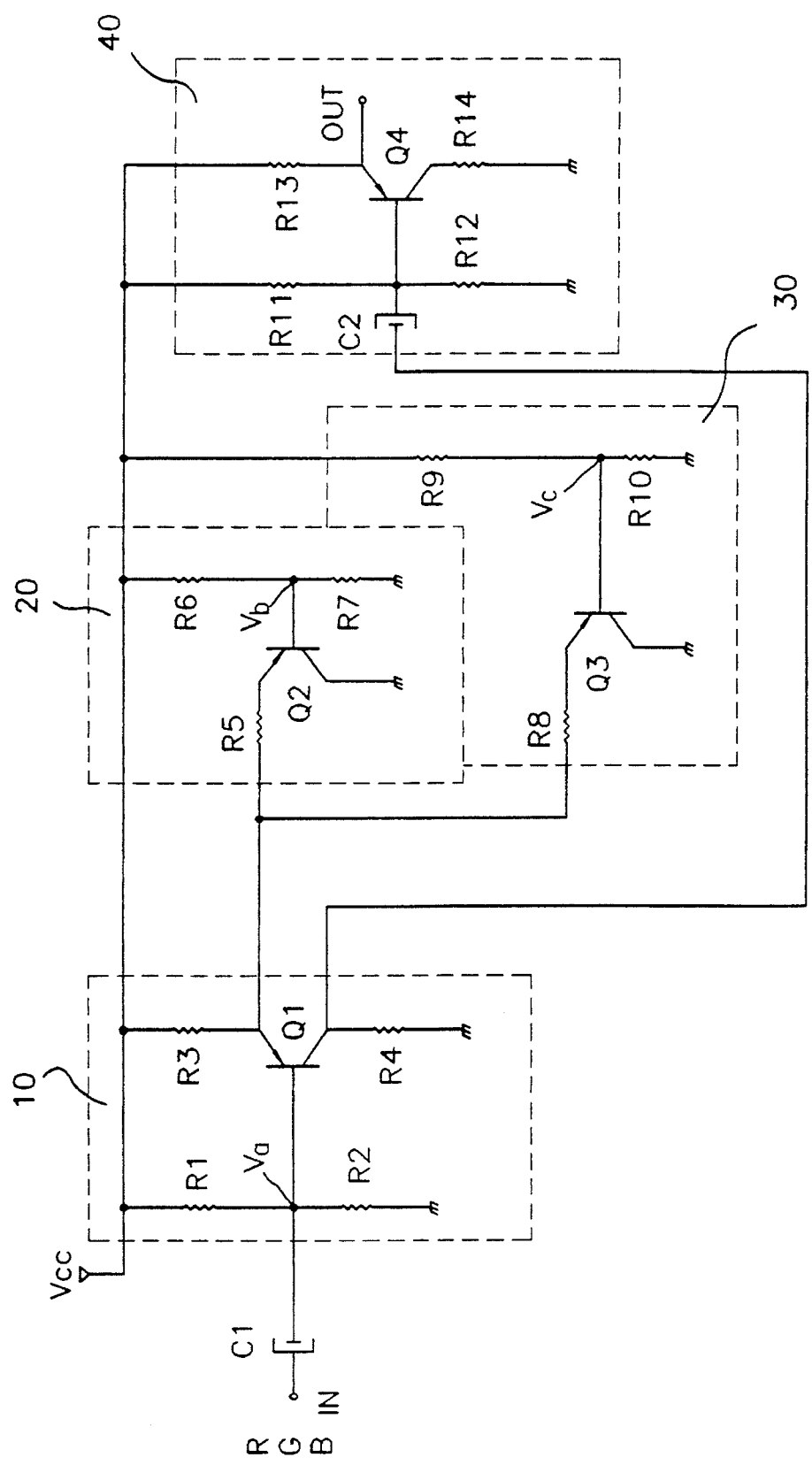

GAMMA-COMPENSATING CIRCUIT USING THE AMPLIFICATION DEGREE OF A TRANSISTOR

BACKGROUND OF THE INVENTION

1. Field of the Invention

The present invention relates to a gamma compensating circuit and, more particularly, to a gamma compensating circuit using the amplification degree of a transistor, which circuit provides a gamma-compensation in a display unit other than a cathode ray tube (CRT) so that the picture reproduced in the display unit may be the same as a real subject without picture distortion.

2. Description of the Prior Art

Generally the CRT is composed of an anode, a cathode, a grid, a heater, etc., and an electron projected into the CRT in the state that a high voltage is applied to a cathode terminal is deflected according to the electronic characteristic, and therefore the picture on the CRT is distorted from the real picture of the subject.

Consequently, in order to improve or eliminate such picture distortion, a TV broadcasting station transmits gamma-compensated signals. Thereafter, the transmitted signals are compensated with a deflection phenomenon (gamma characteristic) of an electron in the CRT and thus are able to reproduce the same picture as the real subject. That is, referring to FIG. 1, the CRT has the gamma characteristic to deflect an electron as shown by curve C in FIG. 1 by virtue of a high voltage applied thereto, and thus a broadcasting station transmits the gamma-compensated signal as shown by curve A in FIG. 1 in consideration of the gamma characteristic of the CRT. And such a gamma-compensated signal from a broadcasting station is converted to a signal having a linear characteristic as shown by curve B in FIG. 1 due to the gamma characteristic of the CRT, thereby to reproduce in the CRT the same picture as the real subject.

However, the gamma-compensated signal from a broadcasting station is not applicable to a display unit, e.g., an LCD projector or AMA projector other than the CRT, and therefore a clear picture cannot be obtained in the CRT. In order to resolve the above-mentioned problem, it is required to provide respective output characteristic curves suitable for various display unit characteristics and for this, a gamma-compensation ROM has been digitally provided and a MAP has also been made to have a gamma reverse compensation characteristic value corresponding to an input signal level in order to convert the input signal level to an output signal level having a linear characteristic.

However, this method has a drawback such that where there are differences in the gamma-compensation values according to the display units, it is impossible to vary the gamma-compensation value accordingly.

Also, a known gamma-compensation circuit disclosed in U.S. Pat. No. 4,480,268 granted to Michitaka Osawa et al., and U.S. Pat. No. 4,589,021 granted to Joichi Sato et al., utilizes the amplification of a transistor and non-linear characteristic of a diode to convert the gamma characteristic, but this conventional gamma-compensation circuit has been defective in that a visibility factor of a picture is apt to be influenced by a picture signal transmitted from a broadcasting station.

SUMMARY OF THE INVENTION

It is therefore an object of the present invention to provide a gamma-compensation circuit which uses the amplification degree of a transistor so as to gamma-compensate linearly the picture signal from a broadcasting station in the display unit and reproduce the picture signal identically to the real subject.

Another object of this invention is to provide a method for linearly compensating the gamma-compensated picture signal inputted from a broadcasting station.

In order to achieve these objects, gamma compensation is provided using the amplification degree of a transistor, and a gamma compensating circuit according to the present invention comprises voltage amplifying means for amplifying a gamma-compensated picture signal which is transmitted from a broadcasting station; and at least one linear-compensation means for converting the output amplification degree of the voltage amplifying means and for making the output of the voltage amplifying means become linear, operating in accordance with the voltage level of the gamma-compensated picture signal.

Further, a method for linearly compensating a gamma-compensated picture signal inputted from a broadcasting station is featured by the fact that the gamma-compensated picture signal is linearly compensated by converting and outputting the amplification degree of a transistor at least one time in accordance with the voltage magnitude thereof.

The above and other objects, features, and advantages of the invention will be more clearly understood from the following detailed description taken in conjunction with the accompanying drawings.

BRIEF DESCRIPTION OF THE DRAWINGS

FIG. 2 is a circuit diagram of a gamma-compensation circuit according to an embodiment of the present invention.

DESCRIPTION OF THE PREFERRED EMBODIMENT

Referring to FIG. 2, a gamma compensating circuit using the amplification degree of a transistor according to this invention comprises a first voltage inverting amplification circuit 10 for amplifying a gamma-compensated output voltage of a picture signal which is inputted from a base of a transistor Q1, a first nonlinear compensation circuit 20 for firstly linearly compensating the output voltage of the first voltage inverting amplification circuit 10, a second nonlinear compensation circuit 30 for secondly linearly compensating the output voltage of the voltage inverting amplification circuit 10 which has been firstly linearly compensated by the first nonlinear compensation circuit 20, and a second voltage inverting amplification circuit 40 for amplifying and outputting the output voltage of the first voltage inverting amplification circuit 10 which has been firstly and secondly linearly compensated.

As shown in FIG. 2, the first voltage inverting amplification circuit 10 consists of resistors R1 to R4, a capacitor C1, and the transistor Q1. A gamma-compensated signal transmitted from a broadcasting station is inputted to the base of the transistor Q1 (hereinafter referred to as a "RGB terminal IN") via the capacitor C1.

A power source Vcc is divided by the resistors R1, R2 in such a manner that the divided voltage of $$\frac{R2}{R1+R2} \times Vcc$$

is inputted to the base of the transistor Q1, and thee resistors R3, R4 are connected to emitter and collector terminals of the transistor Q1, respectively. Accordingly, the gamma-compensated output voltage (assume that it has the magnitude of 1 Vpp) which has been inputted to the RGB terminal IN is represented as curve A in FIG. 3.

Meanwhile, the first nonlinear compensation circuit 20 consists of resistors R5 to R7 and a transistor Q2. An emitter of the transistor Q2 is connected to the emitter of the transistor Q1 of the first voltage inverting amplification circuit via the resistor R5. The power source Vcc is divided by the resistors R6, R7 and applied to a base of the transistor Q2. When the voltage difference between a base terminal voltage Va of the transistor Q1 of the first voltage inverting amplification circuit 10 and a base terminal voltage Vb of the transistor Q2 of the first nonlinear compensation circuit 20 is more than 0.2 V, the transistor Q2 of the first nonlinear compensation circuit 20 turns ON.

Thus, since the transistor Q2 is ON responding to the input signal of the RGB terminal IN having the magnitude more than Va+0.2 [V], the resistors R3, R5 are in the state of parallel-connection with each other, and at this time, the amplification gradient of the first voltage inverting amplification circuit 10 becomes $$\frac{R4}{R3//R5}.$$

Figure 1:
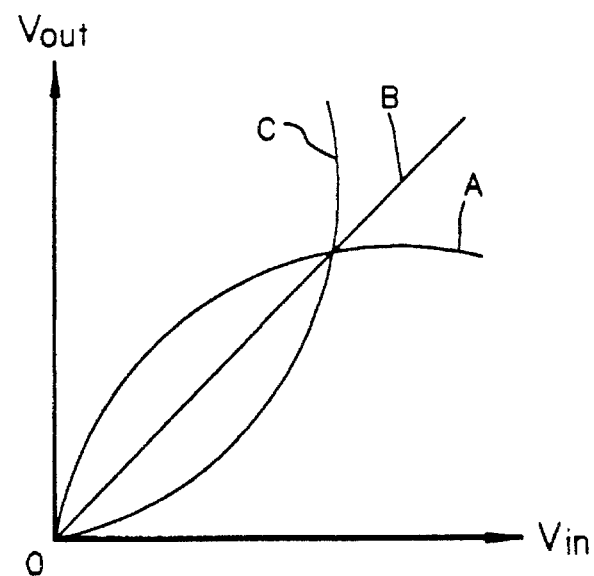
FIG. 1 is a graph showing that a gamma-compensated output picture signal from a broadcasting station is linearly compensated by a gamma characteristic of a CRT.
Figure 3:
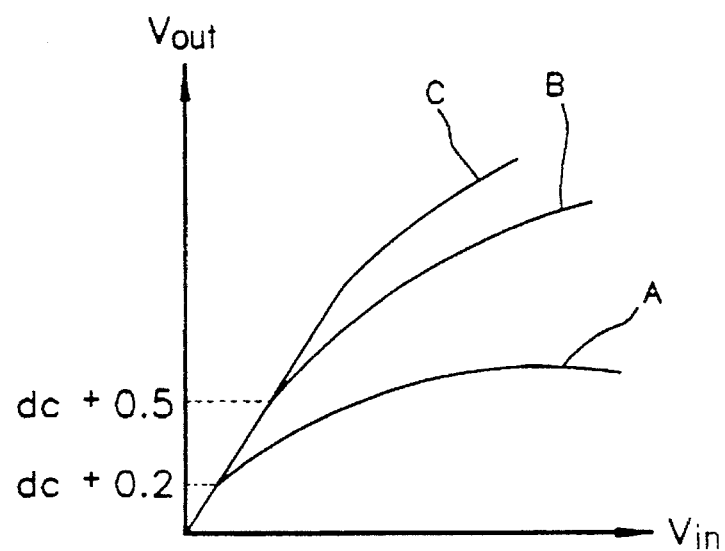
FIG. 3 is a graph showing that the gamma-compensated output signal from a broadcasting station is linearly compensated by the gamma-compensation circuit of FIG. 2.

The gamma-compensated output voltage of the picture signal which has been converted by such an amplification gradient is also converted to the voltage represented as curve B having gradient dc+0.2 [Vdc] as shown in FIG. 3, and thus first linearly compensated signal is outputted at the collector terminal of the transistor Q1.

As also shown in FIG. 2, the second nonlinear compensation circuit 30 consists of resistors R8 to R10 and a transistor Q3. An emitter of the transistor Q3 is connected to the emitter of the transistor Q1 of the first voltage inverting amplification circuit via the resistor R8. The power source Vcc is divided by the resistors R9, R10 and applied to a base of the transistor Q3. When the voltage difference between a base terminal voltage Va of the transistor Q1 of the first voltage inverting amplification circuit 10 and a base terminal voltage Vc of the transistor Q3 of the second nonlinear compensation circuit 30 is more than 0.5 V, the transistor Q3 of the second nonlinear compensation circuit 30 becomes ON.

Thus, since the transistor Q3 is ON responding to the input signal of the RGB terminal IN having the magnitude more than Va+0.5 [V], the resistors R3, R5, R8 are in the state of parallel-connection with each other, and at this time, the amplification gradient of the first voltage inverting amplification circuit 10 becomes $$\frac{R4}{R3//R5//R8}.$$

The gamma-compensated output voltage of the pictured subject which has been converted by such an amplification gradient is also converted to a voltage represented as curve C having gradient dc+0.5 [Vdc] as shown in FIG. 3, and thus second linearly compensated signal is outputted at the collector terminal of the transistor Q1.

In addition, the second voltage inverting amplification circuit 40 consists of resistors R11 to R14, a capacitor C1, and a transistor Q4, as shown in FIG. 2.

A base of the transistor Q4 is connected to the collector terminal of the first voltage inverting amplication circuit 10 via the capacitor C2 to invertly amplify the output signal of the first voltage inverting amplification circuit 10.

As described hereinabove, the gamma compensating circuit using the amplification degree of a transistor in accordance with the present invention can obtain the linear output from the gamma-compensated input signal transmitted from a broadcasting station by means of the pre-determined amplification gradient conversion of transistors thereby being able to obtain a clear picture even in the display unit such as LCD projector or AMA projector.

What is claimed is:

1. A gamma-compensating circuit using the amplification degree of a transistor, said gamma-compensating circuit comprising:

a first voltage amplifying means for firstly amplifying a gamma-compensated picture signal transmitted from a broadcasting station through a first capacitor and for outputting a firstly amplified gamma-compensated picture signal, said first voltage amplifying means having a first transistor with a first base for receiving said gamma-compensated picture signal, said first base being connected to a power source through a first resistor and being grounded through a second resistor so that said power source is divided by said first and second resistors to be supplied to said first base, a first collector through which said amplified gamma-compensated picture signal is outputted and said first collector being grounded through a fourth resistor and a first emitter being connected to said power source through a third resistor; and a first nonlinear compensation means for converting an amplification degree of said first voltage amplifying means and for linearizing said firstly amplified gamma-compensated picture signal operating in accordance with the voltage level of said gamma-compensated picture signal, said first nonlinear compensation means being connected to said first voltage amplifying means.

2. The gamma-compensating circuit as claimed in claim 1, further comprising a second voltage amplifying means for secondly amplifying said firstly amplified gamma-compensated picture signal and for outputting a secondly amplified gamma-compensated picture signal, said second voltage amplifying means having a fourth transistor with a fourth base for receiving said firstly amplified gamma-compensated picture signal through a second capacitor, said fourth base being connected to a power source through an eleventh resistor and being grounded through a twelfth resistor, a fourth collector grounded through a fourteenth resistor and a fourth emitter through which said secondly amplified gamma-compensated picture signal is outputted and said fourth emitter being connected to said power source through a thirteenth resistor.

3. The gamma-compensating circuit as claimed in claim 1, wherein said first nonlinear compensation means has a second transistor with a second base connected to said power source through a sixth resistor and being grounded through a seventh resistor so that said power source is divided by said sixth and seventh resistors to be supplied to said second base, a second collector being grounded and a second emitter being connected to said first emitter through a fifth resistor.

4. The gamma-compensating circuit as claimed in claim 3, further comprising:

a second nonlinear compensation means for secondly converting an amplification degree of said first transistor and for linearizing said amplified gamma-compensated picture signal in accordance with the voltage level of said gamma-compensated picture signal, said second nonlinear compensation means having a third transistor with a third base connected to said power source through a ninth resistor and being grounded through a tenth resistor so that said power source is divided by said ninth and tenth resistors to be supplied to said third base, a third collector being grounded and a third emitter being connected to said first emitter through an eighth resistor.

* * * * *